United States Patent
Andersson et al.

(10) Patent No.: US 10,615,915 B2
(45) Date of Patent: Apr. 7, 2020

(54) TRANSPORT BLOCK SIZE DETERMINATION FOR EQUAL SIZE CODE BLOCKS

(71) Applicant: Telefonaktiebolaget LM Ericsson (publ), Stockholm (SE)

(72) Inventors: Mattias Andersson, Sundbyberg (SE); Yufei Blankenship, Kildeer, IL (US); Sara Sandberg, Luleå (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 16/229,848

(22) Filed: Dec. 21, 2018

(65) Prior Publication Data
US 2019/0173615 A1 Jun. 6, 2019

Related U.S. Application Data

(63) Continuation of application No. 16/088,282, filed as application No. PCT/IB2018/056050 on Aug. 10, 2018.
(Continued)

(51) Int. Cl.
| | | |
|---|---|---|
| *H04L 1/00* | (2006.01) | |
| *H04L 5/00* | (2006.01) | |
| *H04W 72/04* | (2009.01) | |

(52) U.S. Cl.
CPC .......... *H04L 1/0063* (2013.01); *H04L 1/0003* (2013.01); *H04L 1/0041* (2013.01);
(Continued)

(58) Field of Classification Search
CPC .. H04L 1/0063; H04L 1/0003; H04W 72/042; H04W 72/0446
See application file for complete search history.

(56) References Cited

U.S. PATENT DOCUMENTS 8,671,336 B2 * 3/2014 Kim .................. H04L 1/0065
714/807
2015/0381209 A1 * 12/2015 Roh .................. H03M 13/09
714/755
(Continued)

OTHER PUBLICATIONS

PCT Notification of Transmittal of the International Search Report and Written Opinion; International Search Report and Written Opinion (ISA/210/220/237) dated Nov. 26, 2018.
(Continued)

*Primary Examiner* — Hassan Kizou
*Assistant Examiner* — Deepa Belur
(74) *Attorney, Agent, or Firm* — Baker Botts, LLP

(57) ABSTRACT

According to some embodiments, a method for use in a wireless receiver comprises determining a transport block size, TBS, for a transport block to be communicated between the wireless transmitter and a wireless receiver via a physical channel transmission. The TBS determination uses a formula accounting for cyclic redundancy check, CRC, bits. The method further comprises transmitting the transport block according to the determined TBS. In particular embodiments the formula is based on an approximate transport block size, a number of code blocks, at least one of a number of CRC bits attached to the transport block, and a number of CRC bits added to each of the C code blocks.

14 Claims, 8 Drawing Sheets

Related U.S. Application Data

(60) Provisional application No. 62/544,727, filed on Aug. 11, 2017.

(52) U.S. Cl.
CPC .......... *H04L 1/0061* (2013.01); *H04L 5/0044* (2013.01); *H04W 72/042* (2013.01); *H04W 72/0446* (2013.01)

(56) References Cited

U.S. PATENT DOCUMENTS

| | | | | |
|---|---|---|---|---|
| 2016/0234812 | A1* | 8/2016 | Kim | H04L 1/004 |
| 2017/0127316 | A1* | 5/2017 | Chen | H04L 1/0061 |
| 2018/0241499 | A1* | 8/2018 | Einhaus | H04L 1/00 |
| 2018/0278370 | A1* | 9/2018 | Jeong | H04L 1/0058 |
| 2019/0045390 | A1* | 2/2019 | Davydov | H04W 28/0273 |

OTHER PUBLICATIONS

LG Electronics: "Considerations on TB size selection", 3GPP Draft; R1-080998, 3rd Generation Partnership Project (3GPP), Mobile Competence Centre; 650, Route Des Lucioles; F-06921 Sophia-Antipolis Cedex; France, vol. RAN WG1, no Sorrento, Italy; Feb. 6, 2008, Feb. 6, 2008 (Feb. 6, 2008), XP050109466.

Samsung: "CB Segmentation on Data Channel" 3GPP Draft: R1-1710742 CB Segmentation for Data Channel Final, 3rd Generation Partnership Project (3GPP), Mobile Competence Centre; 650, Route Des Lucioles; F-06921 Sophia-Antipolis Cedex; France vol. RAN WG1 No. Wingtao, P.R. China; Jun. 27, 2017—2010630 Jun. 26, 2017 XP051299947.

ZTE: "Consideration on coding chain for eMBB data channel" 3GPP Draft; R1-1710844 Consideration on Coding Chain for EMBB Data Channel_Final, 3rd Generation Partnership Project (3GPP), Mobile Competence Centre; 650, Route Des Lucioles; F-06921 Sophia-Antipol vol. RAN WG1, no Qingdau, P.R. China; Jun. 27, 2017-Jun. 30, 2017 Jun. 26, 2017 (Jun. 26, 2017) XP051300048.

Ericsson: "On MCS/transport Block Size Determination" 3GPP Draft; R1-1711501 on MCS Transport Block Size Determination, 3rd Generation Partnership Project (3GPP), Mobile Competence Centre; 650 Route Des Lucioles; F-06921 Sophia-Antipolis Cedex; Franc vol. RAN WG1 no Qingdao, P.R. China Jun. 27, 2017-Jun. 30, 2017 XP051300686.

Ericsson: "TB Size and Code Block Segmentation for NR Data Channel" 3GPP Draft; R1-1717992 TB Size and Code Block Segmentation for NR Data Channel, 3rd Generation Partnership Project (3GPP), Mobile Competence Centre; 650, Route Des Lucioles; F-06921 Sophia-Antipolis: vol. RAN WG1 No. Prague, CA Oct. 9, 2017-10171013 XP051341176.

Ericsson: "Code Block Segmentation for LDPC Codes", 3GPP Draft; R1-1714547 Code Block Segmentation for LDPC Codes, 3rd Generation Partnership Project (3GPP), Mobile Competence Centre; 650, Route Des Lucioles; F-06921 Sophia-Antipolis Cedex, France vol. RAN WG1 No. Prague, P.R. Czechia Aug. 21, 2017-Aug. 25, 2017 XP051317321.

* cited by examiner

TRANSPORT BLOCK SIZE DETERMINATION FOR EQUAL SIZE CODE BLOCKS

PRIORITY

This application is a continuation, under 35 U.S.C. § 120 of U.S. Ser. No. 16/088,282 which is a U.S. National Stage Filing under 35 U.S.C. § 371 of International Patent Application Serial No. PCT/IB2018/056060 filed Aug. 10, 2018, and entitled "Transport Block Size Determination for Equal Size Code Blocks" which claims priority to U.S. Provisional Patent Application No. 62/544,727 filed Aug. 11, 2017, all of which are hereby incorporated by reference in their entirety.

TECHNICAL FIELD

Particular embodiments are directed to wireless communications and, more particularly, to determining a transport block size for equal size code blocks.

BACKGROUND

The terms UE (User Equipment), terminal, handset, etc. may be used interchangeably to denote a device that communicates with the network infrastructure. The term should not be construed as to mean any specific type of device, it applies to them all, and the embodiments described herein are applicable to all devices that may use the embodiments to solve the problems as described.

Similarly, a base-station is intended to denote a node in the network infrastructure that communicates with the UE. Different names may be applicable, and the functionality of the base-station may also be distributed in various ways. For example, a radio head may terminate parts of the radio protocols and a centralized unit may terminate other parts of the radio protocols. This disclosure does not distinguish such implementations herein. The term base-station refers to all alternative architectures that can implement the embodiments described herein.

Third Generation Partnership Project (3GPP) describes a new radio (NR) interface for fifth generation (5G) networks. Terms for denoting this new and next generation technology have not yet converged, so the terms NR and 5G may be used interchangeably. Moreover, a base-station can be referred to as gNB instead of eNB. Alternatively, the term Transmission-Receive-Point (TRP) can also be used.

An NR radio slot consists of several orthogonal frequency division multiplexed (OFDM) symbols. The slot includes either 7 or 14 symbols with OFDM subcarrier spacing≤60 kHz and 14 symbols for OFDM subcarrier spacing>60 kHz. FIG. 1 illustrates a subframe with 14 OFDM symbols. In FIG. 1, $T_S$ and $T_{symb}$ denote the slot and OFDM symbol duration, respectively. In addition, a slot may be shortened to accommodate downlink/uplink transient periods or both downlink and uplink transmissions. Potential variations are illustrated in FIG. 2.

Furthermore, NR also defines mini-slots. Mini-slots are shorter than slots (according to current agreements, mini-slots include from 1 or 2 symbols up to the number of symbols in a slot minus one) and can start at any symbol. Mini-slots are used if the transmission duration of a slot is too long or the occurrence of the next slot start (slot alignment) is too late. Applications of mini-slots include, among others, latency critical transmissions (in this case both mini-slot length and frequent opportunity of mini-slot are important) and unlicensed spectrum where a transmission should start immediately after listen-before-talk succeeded (here the frequent opportunity of mini-slot is especially important). An example of mini-slots is illustrated in FIG. 3.

PDCCHs (physical downlink control channels) are used in NR for downlink control information (DCI), e.g. downlink scheduling assignments and uplink scheduling grants. The PDCCHs are in general transmitted at the beginning of a slot and relate to data in the same or a later slot (for mini-slots PDCCH can also be transmitted within a regular slot). Different formats (sizes) of the PDCCHs are possible to handle different DCI payload sizes and different aggregation levels (i.e., different code rate for a given payload size). A UE is configured (implicitly and/or explicitly) to monitor (or search) for a number of PDCCH candidates of different aggregation levels and DCI payload sizes. Upon detecting a valid DCI message (i.e., the decoding of a candidate is successful and the DCI contains an ID the UE is told to monitor) the UE follows the DCI (e.g., receives the corresponding downlink data or transmits in the uplink).

NR may include a broadcasted control channel to be received by multiple UEs. The channel has may be referred to as group common PDCCH. One example of information that might be put in such a channel is information about the slot format (i.e., whether a certain slot is uplink or downlink, which portion of a slot is uplink or downlink, information that can be useful in a dynamic time division duplex (TDD) system, etc.).

The downlink control information (DCI) carries several parameters to instruct the UE how to receive the downlink transmission or to transmit in the uplink. For example, the frequency division duplex (FDD) long term evolution (LTE) DCI format 1A carries parameter such as localized/distributed virtual resource block (VRB) assignment flag, resource block assignment, modulation and coding scheme (MCS), hybrid automatic repeat request (HARQ) process number, new data indicator (NDI), redundancy version and transmission power control (TPC) command for physical uplink control channel (PUCCH).

One of the key parameter for the UE to receive or transmit in the system is the size of the data block (called transport block size) to be channel coded and modulated. In LTE, this is determined as follows. The UE uses an MCS given by the DCI to read a transport block size (TBS) index $I_{TBS}$ from a MCS table. An example of the MCS table is shown in Table 1 below. The UE determines the number of physical resource blocks (PRBs) as $N_{PRB}$ from the resource block assignment in the DCI. The UE uses the TBS index $I_{TBS}$ and the number of PRBs $N_{PRB}$ to read the actual transport block size from a TBS table. A portion of the TBS table is shown in Table 2 below as an example.

TABLE 1

LTE modulation and coding scheme (MCS) table

| MCS Index $I_{MCS}$ | Modulation Order $Q_m$ | TBS Index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |

TABLE 1-continued

LTE modulation and coding scheme (MCS) table

| MCS Index $I_{MCS}$ | Modulation Order $Q_m$ | TBS Index $I_{TBS}$ |
|---|---|---|
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | reserved |
| 30 | 4 | |
| 31 | 6 | |

TABLE 2

LTE transport block size (TBS) table (dimension is 27 × 110)

| $I_{TBS}$ | \multicolumn{9}{c}{$N_{PRB}$} | |
|---|---|---|---|---|---|---|---|---|---|---|

| $I_{TBS}$ | 1 | 2 | 3 | 4 | 5 | 6 | 7 | 8 | 9 | ... |
|---|---|---|---|---|---|---|---|---|---|---|
| 0 | 16 | 32 | 56 | 88 | 120 | 152 | 176 | 208 | 224 | ... |
| 1 | 24 | 56 | 88 | 144 | 176 | 208 | 224 | 256 | 328 | ... |
| 2 | 32 | 72 | 144 | 176 | 208 | 256 | 296 | 328 | 376 | ... |
| 3 | 40 | 104 | 176 | 208 | 256 | 328 | 392 | 440 | 504 | ... |
| 4 | 56 | 120 | 208 | 256 | 328 | 408 | 488 | 552 | 632 | ... |
| 5 | 72 | 144 | 224 | 328 | 424 | 504 | 600 | 680 | 776 | ... |
| 6 | 328 | 176 | 256 | 39/ | 504 | 600 | 712 | 808 | 936 | ... |
| 7 | 104 | 224 | 328 | 472 | 584 | 712 | 840 | 968 | 1096 | ... |
| 8 | 120 | 256 | 392 | 536 | 680 | 808 | 968 | 1096 | 1256 | ... |
| 9 | 136 | 296 | 456 | 616 | 776 | 936 | 1096 | 1256 | 1416 | ... |
| 10 | 144 | 328 | 504 | 680 | 872 | 1032 | 1224 | 1384 | 1544 | ... |
| 11 | 176 | 376 | 584 | 776 | 1000 | 1192 | 1384 | 1608 | 1800 | ... |
| 12 | 208 | 440 | 680 | 904 | 1128 | 1352 | 1608 | 1800 | 2024 | ... |
| 13 | 224 | 488 | 744 | 1000 | 1256 | 1544 | 1800 | 2024 | 2280 | ... |
| 14 | 256 | 552 | 840 | 1128 | 1416 | 1736 | 1992 | 2280 | 2600 | ... |
| 15 | 280 | 600 | 904 | 1224 | 1544 | 1800 | 2152 | 2472 | 2728 | ... |
| 16 | 328 | 632 | 968 | 1288 | 1608 | 1928 | 2280 | 2600 | 2984 | ... |
| 17 | 336 | 696 | 1064 | 1416 | 1800 | 2152 | 2536 | 2856 | 3240 | ... |
| 18 | 376 | 776 | 1160 | 1544 | 1992 | 2344 | 2792 | 3112 | 3624 | ... |
| 19 | 408 | 840 | 1288 | 1736 | 2152 | 2600 | 2984 | 3496 | 3880 | ... |
| 20 | 440 | 904 | 1384 | 1864 | 2344 | 2792 | 3240 | 3752 | 4136 | ... |
| 21 | 488 | 1000 | 1480 | 1992 | 2472 | 2984 | 3496 | 4008 | 4584 | ... |
| 22 | 520 | 1064 | 1608 | 2152 | 2664 | 3240 | 3752 | 4264 | 4776 | ... |
| 23 | 552 | 1128 | 1736 | 2280 | 2856 | 3496 | 4008 | 4584 | 5160 | ... |
| 24 | 584 | 1192 | 1800 | 2408 | 2984 | 3624 | 4264 | 4968 | 5544 | ... |
| 25 | 616 | 1256 | 1864 | 2536 | 3112 | 3752 | 4392 | 5160 | 5736 | ... |
| 26 | 712 | 1480 | 2216 | 2984 | 3752 | 4392 | 5160 | 5992 | 6712 | ... |

The LTE approach has a few problems described in the following. A first problem is that the LTE TBS table was originally designed with specific assumptions on the number of resource elements (REs) available within each allocated PRB as well as the number of OFDM symbols for data transmissions. When different transmission modes with different amounts of reference symbol overheads were introduced later in LTE, it became difficult to define another TBS table to optimize for the new transmission modes. The 3GPP participants compromised to introduce a few new rows in the LTE TBS table to optimize for a few limited cases. The explicit TBS table approach, however, hinders continual evolution and improvement of the LTE system.

Another problem is that the existing approach of determining the data block size does not provide high performance operation with different slot sizes or structures. This is a known problem in LTE systems because a subframe in LTE may be of various sizes. A regular subframe may have different sizes of control region and thus leaves different sizes for the data region. TDD LTE supports different sizes in the downlink part (DwPTS) of a TDD special subframe. Various different sizes of subframe are summarized in Table 3 below.

The LTE MCS and TBS tables are designed, however, based on the assumption that 11 OFDM symbols are available for the data transmission. When the actual number of available OFDM symbols for physical downlink shared channel (PDSCH) is different than 11, the spectral efficiency of the transmission will deviate from those shown in Table 4 below.

First, the code rate becomes excessively high when the actual number of OFDM symbols for PDSCH is substantially less than the assumed 11 symbols. These cases are highlighted with bold type in Table 4. In LTE, the UE is not expected to decode any PDSCH transmission with effective code rate higher than 0.930. Because the mobile station will not be able to decode such high code rates, transmissions based on these bold type MCSs will fail and retransmissions will be needed.

Second, with the mismatch of radio resource assumption, code rates for some of the MCSs deviate out of the optimal range for the wideband wireless system. Based on extensive link performance evaluation for the downlink transmission as an example, the code rates for QPSK and 16QAM should not be higher than 0.70. Furthermore, the code rates for 16 QAM and 64 QAM should not be lower than 0.32 and 0.40, respectively. As illustrated with underlined type, some of the MCSs in Table 4 result in sub-optimal code rate.

Because data throughput is reduced when transmissions are based on unsuitable or sub-optimal code rates, a good scheduling implementation in the base station should avoid using any bold or underlined MCSs shown in Table 4. Thus, the number of usable MCSs shrink significantly when the actual number of OFDM symbols for PDSCH deviates from the assumed 11 symbols.

TABLE 3

Available number of OFDM symbols for PDSCH ($N_{OS}$) in LTE

| | | Number of OFDM symbols for control information | | | |
|---|---|---|---|---|---|
| Operation mode | | 1 | 2 | 3 | 4 |
| FDD, TDD | Normal CP | 13 | 12 | 11 | 10 |
| | Extended CP | 11 | 10 | 9 | 8 |
| TDD DwPTS normal CP | configurations 1, 6 | 8 | 7 | 6 | 5 |
| | configurations 2, 7 | 9 | 8 | 7 | 6 |
| | configurations 3, 8 | 10 | 9 | 8 | 7 |
| | configuration 4 | 11 | 10 | 9 | 8 |
| TDD DwPTS extended CP | configurations 1, 5 | 7 | 6 | 5 | 4 |
| | configurations 2, 6 | 8 | 7 | 6 | 5 |
| | configuration 3 | | | | |

TABLE 4

Code rate with different number of OFDM symbols for data transmission in LTE

| MCS index ($I_{MCS}$) | Modulation | \multicolumn{9}{c}{Available number of OFDM symbols for PDSCH ($N_{OS}$)} |
|---|---|---|---|---|---|---|---|---|---|---|
| | | 13 | 12 | 11 | 10 | 9 | 8 | 7 | 6 | 5 |
| 0 | QPSK | 0.10 | 0.11 | 0.12 | 0.13 | 0.14 | 0.16 | 0.18 | 0.21 | 0.25 |
| 1 | QPSK | 0.13 | 0.14 | 0.16 | 0.17 | 0.19 | 0.21 | 0.24 | 0.28 | 0.34 |
| 2 | QPSK | 0.16 | 0.17 | 0.19 | 0.21 | 0.23 | 0.26 | 0.30 | 0.35 | 0.42 |
| 3 | QPSK | 0.21 | 0.22 | 0.25 | 0.27 | 0.30 | 0.34 | 0.39 | 0.45 | 0.54 |
| 4 | QPSK | 0.25 | 0.28 | 0.30 | 0.33 | 0.37 | 0.41 | 0.47 | 0.55 | 0.66 |
| 5 | QPSK | 0.31 | 0.34 | 0.37 | 0.41 | 0.45 | 0.51 | 0.58 | 0.68 | *0.81* |
| 6 | QPSK | 0.37 | 0.40 | 0.44 | 0.48 | 0.54 | 0.61 | 0.69 | *0.81* | 0.97 |
| 7 | QPSK | 0.44 | 0.47 | 0.52 | 0.57 | 0.63 | *0.71* | *0.81* | 0.94 | 1.13 |
| 8 | QPSK | 0.50 | 0.54 | 0.59 | 0.65 | *0.72* | *0.81* | *0.93* | 1.08 | 1.30 |
| 9 | QPSK | 0.56 | 0.61 | 0.67 | *0.73* | *0.81* | 0.91 | 1.05 | 1.22 | 1.46 |
| 10 | 16 QAM | *0.28* | *0.30* | 0.33 | 0.37 | 0.41 | 0.46 | 0.52 | 0.61 | 0.73 |
| 11 | 16 QAM | *0.31* | 0.34 | 0.37 | 0.41 | 0.45 | 0.51 | 0.58 | 0.68 | 0.81 |
| 12 | 16 QAM | 0.36 | 0.39 | 0.43 | 0.47 | 0.52 | 0.58 | 0.67 | *0.78* | 0.94 |
| 13 | 16 QAM | 0.40 | 0.44 | 0.48 | 0.53 | 0.58 | 0.66 | *0.75* | *0.88* | 1.05 |
| 14 | 16 QAM | 0.46 | 0.50 | 0.54 | 0.59 | 0.66 | *0.74* | *0.85* | 0.99 | 1.19 |
| 15 | 16 QAM | 0.51 | 0.55 | 0.60 | 0.66 | *0.74* | *0.83* | 0.95 | 1.10 | 1.33 |
| 16 | 16 QAM | 0.54 | 0.59 | 0.64 | *0.71* | *0.79* | *0.88* | 1.01 | 1.18 | 1.41 |
| 17 | 64 QAM | *0.36* | *0.39* | 0.43 | 0.47 | 0.52 | 0.59 | 0.67 | 0.79 | 0.94 |
| 18 | 64 QAM | *0.39* | 0.42 | 0.46 | 0.50 | 0.56 | 0.63 | 0.72 | 0.83 | 1.00 |
| 19 | 64 QAM | 0.43 | 0.46 | 0.51 | 0.56 | 0.62 | 0.69 | 0.79 | 0.93 | 1.11 |
| 20 | 64 QAM | 0.47 | 0.51 | 0.55 | 0.61 | 0.68 | 0.76 | 0.87 | 1.01 | 1.22 |
| 21 | 64 QAM | 0.51 | 0.55 | 0.60 | 0.66 | 0.74 | 0.83 | 0.95 | 1.10 | 1.32 |
| 22 | 64 QAM | 0.55 | 0.60 | 0.65 | 0.72 | 0.79 | 0.89 | 1.02 | 1.19 | 1.43 |
| 23 | 64 QAM | 0.59 | 0.64 | 0.70 | 0.77 | 0.86 | 0.96 | 1.10 | 1.29 | 1.54 |
| 24 | 64 QAM | 0.64 | 0.69 | 0.75 | 0.83 | 0.92 | 1.04 | 1.18 | 1.38 | 1.66 |
| 25 | 64 QAM | 0.68 | 0.74 | 0.80 | 0.88 | 0.98 | 1.10 | 1.26 | 1.47 | 1.77 |
| 26 | 64 QAM | 0.72 | 0.78 | 0.85 | 0.94 | 1.04 | 1.17 | 1.34 | 1.56 | 1.88 |
| 27 | 64 QAM | 0.75 | 0.81 | 0.89 | 0.98 | 1.09 | 1.22 | 1.40 | 1.63 | 1.95 |
| 28 | 64 QAM | 0.88 | 0.95 | 1.04 | 1.15 | 1.27 | 1.43 | 1.64 | 1.91 | 2.29 |

As mentioned above, the slot structure for NR tends to be more flexible than LTE with much larger range of the amount of allocated resources for UE to receive or transmit. The benefit of designing a TBS table diminishes significantly.

To solve these problems, suggestions have been made to determine the TBS through a formula instead of a table. One example determines the TBS as follows:

$$TBS = A \times \left\lceil \frac{N_{PRB} \cdot N_{RE}^{DL,PRB} \cdot v \cdot Q_m \cdot R}{A} \right\rceil$$

where
  v is number of layers the codeword is mapped onto
  $N_{RE}^{DL,PRB}$ is the number of REs per PRB per slot/mini-slot available for carrying the PDSCH.
  $N_{PRB}$ is the number of allocated PRBs
  modulation order, $Q_m$, and target code rate, R, are read from a MCS table based on $I_{MCS}$ signalled in the DCI.
  an example value of A is 8, to ensure that TBS is a multiple of 8.

Here $N_{PRB}$, $N_{RE}^{DL,PRB}$, v, $Q_m$, R are signaled through DCI or are configured through higher layers.

A problem with existing solutions is that the LTE transport block size (TBS) table is designed so that when code block segmentation is performed, all code blocks have the same size after segmentation. This property is desirable since it makes implementation easier. When a formula such as the one described above is applied, however, this property is not necessarily fulfilled.

SUMMARY

The embodiments described herein modify the formula for transport block size (TBS) determination to ensure that all code blocks have the same size. According to some embodiments, a wireless transmitter (e.g., network node, user equipment (UE), etc.) comprises processing circuitry operable to determine a TBS for a transport block to be communicated between the wireless transmitter and a wireless receiver via a physical channel transmission. The TBS determination uses a formula accounting for CRC bits. The processing circuitry is further operable to transmit the transport block according to the determined TBS.

In particular embodiments, the processing circuitry is further configured to segment the transport block of size TBS into C equally sized code blocks. The processing circuitry is operable to transmit the transport block according to the determined TBS by transmitting the C equally sized code blocks to a wireless receiver.

According to some embodiments, a method for use in a wireless transmitter comprises determining a TBS for a transport block to be communicated between the wireless transmitter and a wireless receiver via a physical channel transmission. The TBS determination uses a formula accounting for CRC bits. The method further comprises transmitting the transport block according to the determined TBS.

In particular embodiments, the method further comprises segmenting the transport block of size TBS into C equally sized code blocks. Transmitting the transport block comprises transmitting the C equally sized code blocks to a wireless receiver.

In particular embodiments, the CRC bits include at least one of transport block CRC bits and code segmentation CRC bits. The formula may be based on an approximate transport block size, $TBS_0$, a number of code blocks, C, at least one of a number of CRC bits attached to the transport block, $L_2$, and a number of CRC bits added to each of the C code blocks, $L_3$.

In particular embodiments, the formula is based on a comparison of $TBS_0$ plus a number of CRC bits attached to the transport block with a threshold size, Z. When $TBS_0$ plus a number of CRC bits attached to the transport block is greater than the threshold size, Z, the formula includes dividing $TBS_0+L_2$ by C, rounding up to the nearest integer, and multiplying the result by C. Alternatively, when $TBS_0$ plus a number of CRC bits attached to the transport block is greater than the threshold size, Z, the formula includes dividing $TBS_0+L_2$ by C*A|, rounding up to the nearest integer, and multiplying the result by C*A, where A is a constant.

When $TBS_0$ plus a number of CRC bits attached to the transport block is less than the threshold size, Z, the formula includes calculating A*ceil(TBS0/A) for a constant A, wherein, optionally, A=8.

In particular embodiments, the formula includes determining C based on dividing $TBS_0$ plus $L_2$ by Z minus $L_3$, and rounding up to the nearest integer. The formula may include determining the TBS by subtracting $L_2$. A may be one of 1 and 8. $L_2$ may be one of 0, 8, 16, and 24. $L_3$ may be one of 0, 8, 16, and 24. Z may be one of 3840 and 8448.

In particular embodiments, the formula includes determining $TBS_0$ based on available transmission resources by determining the approximate transport block size based on a function of one or more of a number of physical resource blocks, a number of resource elements per physical resource block, a number of layers, a modulation order, and a code rate. In some embodiments, the formula includes determining $TBS_0$ based on available transmission resources by determining the approximate transport block size based on a number of symbols available for transmission and a lookup table.

In particular embodiments, the wireless transmitter is a network node (e.g., base station) or a wireless device (e.g., UE).

According to some embodiments, a wireless receiver comprises processing circuitry operable to receive a wireless signal via a physical channel transmission from a wireless transmitter. The wireless signal corresponds to a transport block. The processing circuitry is operable to determine a TBS using a formula accounting for CRC bits and decode the wireless signal to obtain the transport block.

In particular embodiments, the processing circuitry is further operable to segment the transport block of size TBS into C equally sized code blocks. The processing circuitry is operable to decode the wireless signal by decoding the C equally sized code blocks and combining the decoded code blocks into the transport block.

According to some embodiments, a method for use in a wireless receiver comprises receiving a wireless signal via a physical channel transmission from a wireless transmitter. The wireless signal corresponds to a transport block. The method further comprises determining a TBS using a formula accounting for CRC bits and decoding the wireless signal to obtain the transport block.

In particular embodiments, the method further comprises segmenting the transport block of size TBS into C equally sized code blocks. Decoding the wireless signal comprises decoding the C equally sized code blocks and combining the decoded code blocks into the transport block.

In particular embodiments, the CRC bits include at least one of transport block CRC bits and code segmentation CRC bits. The formula may be based on an approximate transport block size, $TBS_0$, a number of code blocks, C, at least one of a number of CRC bits attached to the transport block, $L_2$, and a number of CRC bits added to each of the C code blocks, $L_3$.

In particular embodiments, the formula is based on a comparison of $TBS_0$ plus a number of CRC bits attached to the transport block with a threshold size, Z. When $TBS_0$ plus a number of CRC bits attached to the transport block is greater than the threshold size, Z, the formula includes dividing $TBS_0+L_2$ by C, rounding up to the nearest integer, and multiplying the result by C. Alternatively, when $TBS_0$ plus a number of CRC bits attached to the transport block is greater than the threshold size, Z, the formula includes dividing $TBS_0+L_2$ by C*A|, rounding up to the nearest integer, and multiplying the result by C*A, where A is a constant.

When $TBS_0$ plus a number of CRC bits attached to the transport block is less than the threshold size, Z, the formula includes calculating A*ceil(TBS0/A) for a constant A, wherein, optionally, A=8.

In particular embodiments, the formula includes determining C based on dividing $TBS_0$ plus $L_2$ by Z minus $L_3$, and rounding up to the nearest integer. The formula may include determining the TBS by subtracting $L_2$. A may be one of 1 and 8. $L_2$ may be one of 0, 8, 16, and 24. $L_3$ may be one of 0, 8, 16, and 24. Z may be one of 3840 and 8448.

In particular embodiments, the formula includes determining $TBS_0$ based on available transmission resources by determining the approximate transport block size based on a function of one or more of a number of physical resource blocks, a number of resource elements per physical resource block, a number of layers, a modulation order, and a code rate. In some embodiments, the formula includes determining $TBS_0$ based on available transmission resources by determining the approximate transport block size based on a number of symbols available for transmission and a lookup table.

In particular embodiments, the wireless receiver is a network node (e.g., base station) or a wireless device (e.g., UE).

According to some embodiments, a wireless transmitter comprises a determining module and a transmitting module. The determining module is operable to determine a TBS for a transport block to be communicated between the wireless transmitter and a wireless receiver via a physical channel transmission. The TBS determination uses a formula accounting for CRC bits. The transmitting module is operable to transmit the transport block according to the determined TBS.

According to some embodiments, a wireless receiver comprises a receiving module and a determining module. The receiving module is operable to receive a wireless signal via a physical channel transmission from a wireless transmitter. The wireless signal corresponds to a transport block. The determining module is operable to determine a TBS using a formula accounting for CRC bits and decode the wireless signal to obtain the transport block.

Also disclosed is a computer program product. The computer program product comprises instructions stored on non-transient computer-readable media which, when executed by a processor, perform the step of determining a TBS for a transport block to be communicated between the wireless transmitter and a wireless receiver via a physical channel transmission. The TBS determination uses a formula accounting for CRC bits. The instructions further perform the step of transmitting the transport block according to the determined TBS.

Another computer program product comprises instructions stored on non-transient computer-readable media which, when executed by a processor, perform the step of receiving a wireless signal via a physical channel transmission from a wireless transmitter. The wireless signal corresponds to a transport block. The instructions further perform the step of determining a TBS using a formula accounting for CRC bits and decoding the wireless signal to obtain the transport block.

Particular embodiments may include some, all, or none of the following advantages. Particular embodiments ensure that all code blocks have the same size, which makes implementation of the encoder and decoder simpler. By adjusting the TBS instead of padding zeros before code block segmentation, more efficient use of resources is achieved, e.g. in full buffer scenarios. Some embodiments may include additional or other advantages.

BRIEF DESCRIPTION OF THE DRAWINGS

For a more complete understanding of the embodiments and their features and advantages, reference is now made to the following description, taken in conjunction with the accompanying drawings, in which.

DETAILED DESCRIPTION

Figure 1:
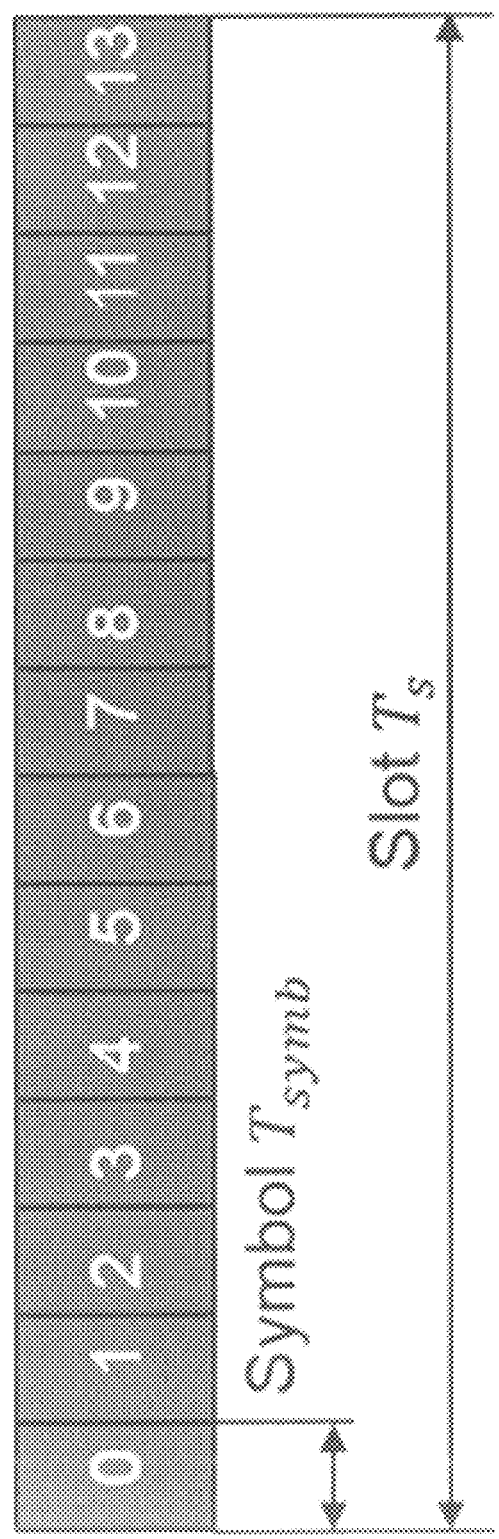
FIG. 1 illustrates an example LTE slot.

Third Generation Partnership Project (3GPP) long term evolution (LTE) uses code block segmentation for transport blocks that are larger than the largest possible code block size. For example, if after adding any CRC bits to a transport block, the transport block is larger than the largest possible code block size, the transport block needs to be segmented into several code blocks. The procedure in LTE is described in 3GPP TS 36.212 V13.2.0 (2016-06) Section 5.1.2. NR may include a similar procedure.

As noted above, a problem with existing solutions is that the LTE transport block size (TBS) table is designed so that when code block segmentation is performed, all code blocks have the same size after segmentation. This property is desirable since it makes implementation easier. When a formula such as the one described above is applied, however, this property is not necessarily fulfilled.

One way of achieving equal size code blocks is to zero pad the transport block before code block segmentation. This has some drawbacks. If the padded zeros are marked as <NULL> and removed before transmission, this leads to different code blocks having different code rates, which is inefficient. If the padded zeros are not removed before transmission, it leads to transmission of useless bits, which is inefficient.

Particular embodiments obviate the problems described above and modify the formula for TBS determination to ensure that all code blocks have the same size. Particular embodiments ensure that all code blocks have the same size, which makes implementation of the encoder and decoder simpler. By adjusting the TBS instead of padding zeros before code block segmentation, more efficient use of resources is achieved (e.g., in full buffer scenarios).

The following description sets forth numerous specific details. It is understood, however, that embodiments may be practiced without the specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Particular embodiments are described with reference to FIGS. 4-8B of the drawings, like numerals being used for like and corresponding parts of the various drawings. LTE and new radio (NR) are used throughout this disclosure as an example cellular system, but the ideas presented herein may apply to other wireless communication systems as well.

Figure 4:
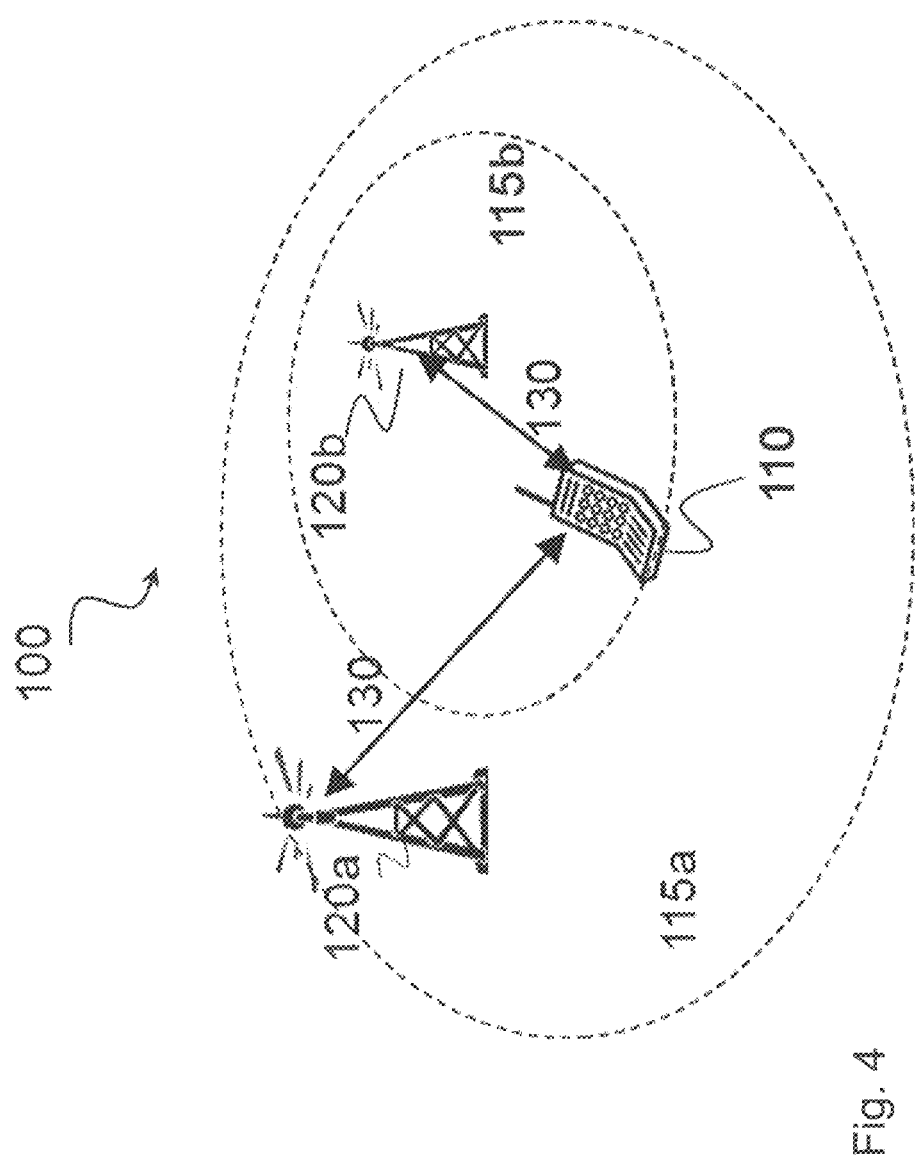
FIG. 4 is a block diagram illustrating an example wireless network, according to a particular embodiment.

FIG. 4 is a block diagram illustrating an example wireless network, according to a particular embodiment. Wireless network 100 includes one or more wireless devices 110 (such as mobile phones, smart phones, laptop computers, tablet computers, MTC devices, or any other devices that can provide wireless communication) and a plurality of network nodes 120 (such as base stations or eNodeBs). Wireless device 110 may also be referred to as a UE. Network node 120 serves coverage area 115 (also referred to as cell 115).

In general, wireless devices 110 that are within coverage of network node 120 (e.g., within cell 115 served by network node 120) communicate with network node 120 by transmitting and receiving wireless signals 130. For example, wireless devices 110 and network node 120 may communicate wireless signals 130 containing voice traffic, data traffic, and/or control signals. A network node 120 communicating voice traffic, data traffic, and/or control signals to wireless device 110 may be referred to as a serving network node 120 for the wireless device 110. Communication between wireless device 110 and network node 120 may be referred to as cellular communication. Wireless signals 130 may include both downlink transmissions (from network node 120 to wireless devices 110) and uplink transmissions (from wireless devices 110 to network node 120).

Each network node 120 may have a single transmitter or multiple transmitters for transmitting signals 130 to wireless devices 110. In some embodiments, network node 120 may comprise a multi-input multi-output (MIMO) system. Wireless signal 130 may comprise one or more beams. Particular beams may be beamformed in a particular direction. Each wireless device 110 may have a single receiver or multiple receivers for receiving signals 130 from network nodes 120 or other wireless devices 110. Wireless device 110 may receive one or more beams comprising wireless signal 130.

Figure 2:
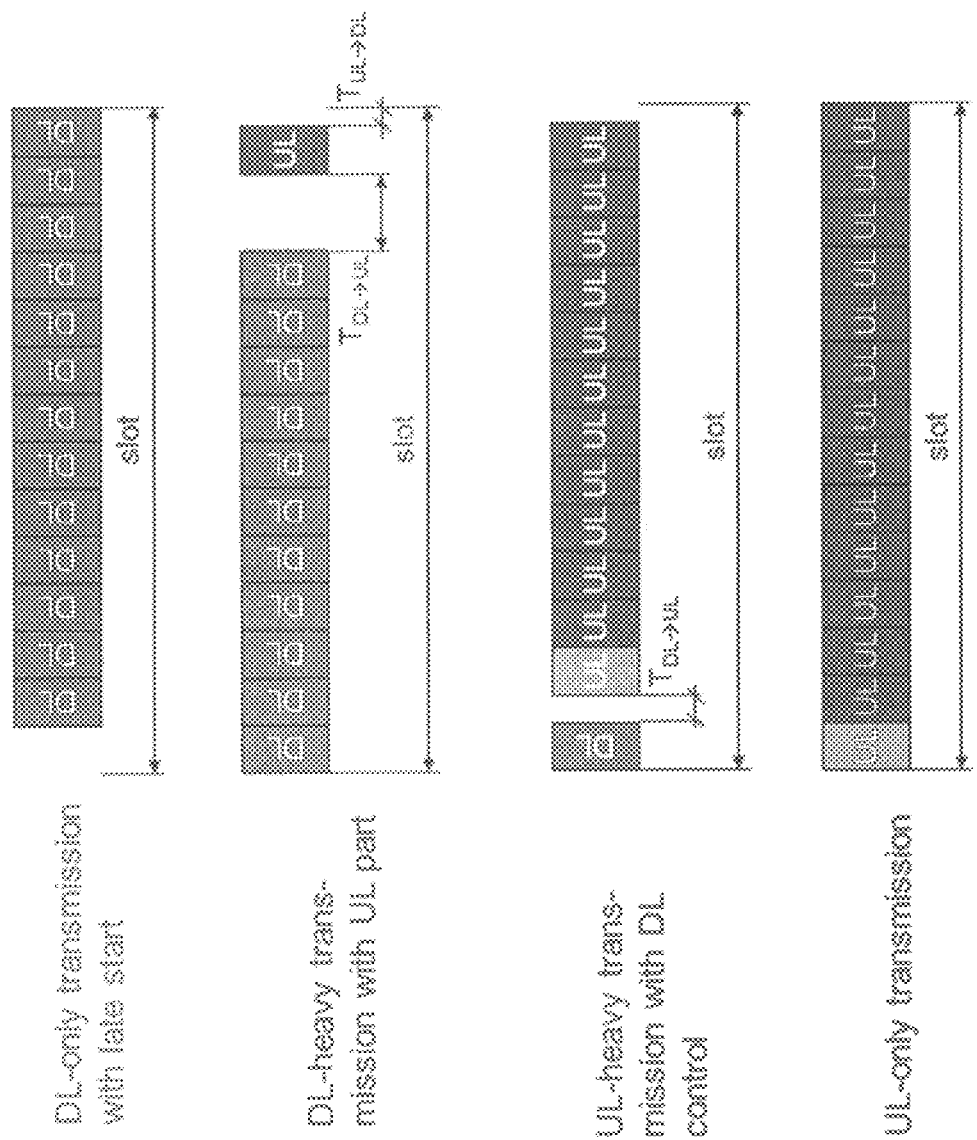
FIG. 2 illustrates examples of slot variations in LTE.
Figure 3:
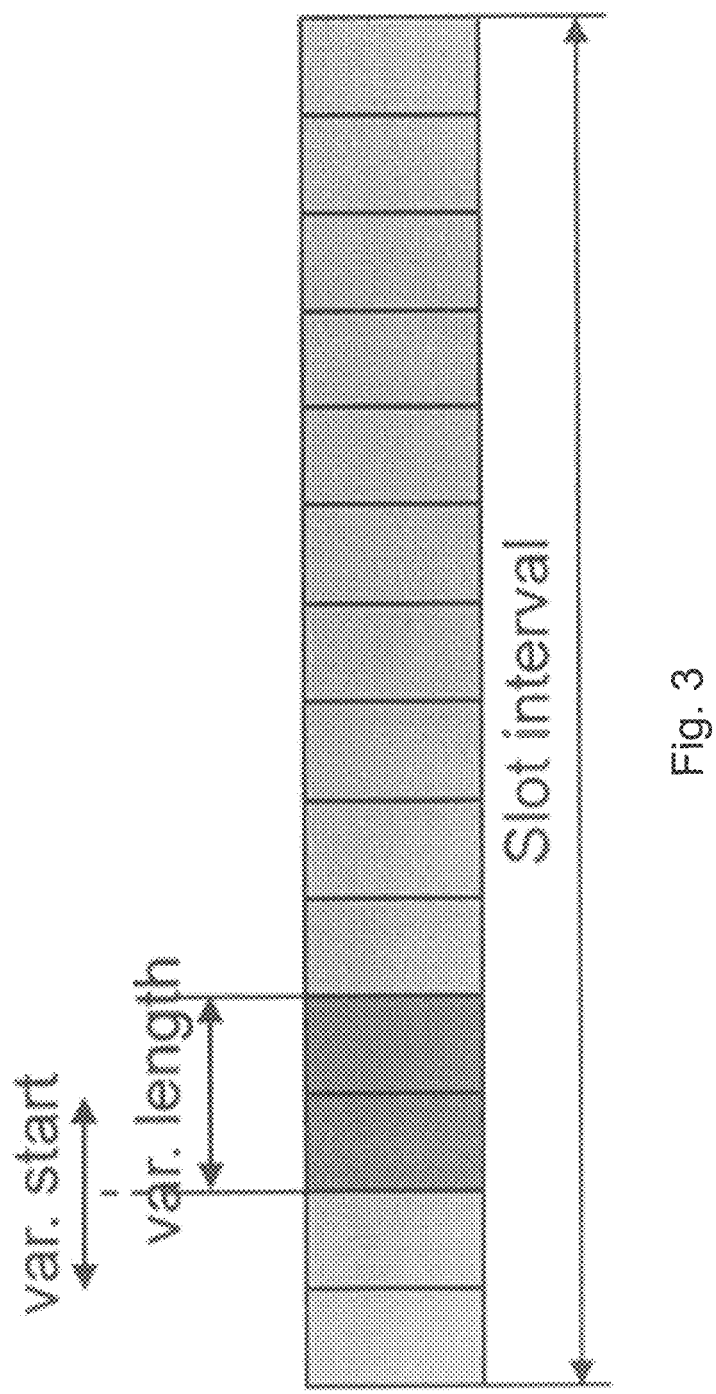
FIG. 3 illustrates a mini-slot with 2 OFDM symbols.

Wireless signals 130 may be transmitted on time-frequency resources. The time-frequency resources may be partitioned into radio frames, subframes, slots, and/or mini-slots, such as those described with respect to FIGS. 1-3. Network node 120 may dynamically schedule subframes/slots/mini-slots as uplink, downlink, or a combination uplink and downlink. Different wireless signals 130 may comprise different transmission processing times.

Network node 120 may operate in a licensed frequency spectrum, such as an LTE spectrum. Network node 120 may also operate in an unlicensed frequency spectrum, such as a 5 GHz Wi-Fi spectrum. In an unlicensed frequency spectrum, network node 120 may coexist with other devices such as IEEE 802.11 access points and terminals. To share the unlicensed spectrum, network node 120 may perform listen-before-talk (LBT) protocols before transmitting or receiving wireless signals 130. Wireless device 110 may also operate in one or both of licensed or unlicensed spectrum and in some embodiments may also perform LBT protocols before transmitting wireless signals 130. Both network node 120 and wireless device 110 may also operate in licensed shared spectrum.

For example, network node 120a may operate in a licensed spectrum and network node 120b may operate in an unlicensed spectrum. Wireless device 110 may operate in both licensed and unlicensed spectrum. In particular embodiments, network nodes 120a and 120b may be configurable to operate in a licensed spectrum, an unlicensed spectrum, a licensed shared spectrum, or any combination. Although the coverage area of cell 115b is illustrated as included in the coverage area of cell 115a, in particular embodiments the coverage areas of cells 115a and 115b may overlap partially, or may not overlap at all.

In particular embodiments, wireless device 110 and network nodes 120 may perform carrier aggregation. For example, network node 120a may serve wireless device 110 as a PCell and network node 120b may serve wireless device 110 as a SCell. Network nodes 120 may perform self-scheduling or cross-scheduling. If network node 120a is operating in licensed spectrum and network node 120b is operating in unlicensed spectrum, network node 120a may provide license assisted access (LAA) to the unlicensed spectrum (i.e., network node 120a is a LAA PCell and network node 120b is a LAA SCell).

In particular embodiments, wireless signals 130 may be transmitted using transport blocks. Transport blocks may be divided in one or more code blocks. Network node 120 and wireless device 110 may segment transport blocks into equal sized code blocks according to any of the examples and embodiments described in more detail below.

For example, network node 120 or wireless device 110 may determine a TBS for a transport block to be communicated between the wireless transmitter and a wireless receiver via a physical channel transmission. The TBS determination uses a formula accounting for CRC bits. Network node 110 or wireless device 110 may transmit the transport block according to the determined TBS. In particular embodiments the formula is based on an approximate transport block size, a number of code blocks, at least one of a number of CRC bits attached to the transport block, and a number of CRC bits added to each of the C code blocks. Wireless device 110 and network node 120 may determine a TBS and a number of equal size code blocks using a similar formula when receiving a transport block. Additional examples are described below.

In wireless network 100, each network node 120 may use any suitable radio access technology, such as long term evolution (LTE), LTE-Advanced, UMTS, HSPA, GSM, cdma2000, NR, WiMax, WiFi, and/or other suitable radio access technology. Wireless network 100 may include any suitable combination of one or more radio access technologies. For purposes of example, various embodiments may be described within the context of certain radio access technologies. However, the scope of the disclosure is not limited to the examples and other embodiments could use different radio access technologies.

As described above, embodiments of a wireless network may include one or more wireless devices and one or more different types of radio network nodes capable of communicating with the wireless devices. The network may also include any additional elements suitable to support communication between wireless devices or between a wireless device and another communication device (such as a landline telephone). A wireless device may include any suitable combination of hardware and/or software. For example, in particular embodiments, a wireless device, such as wireless device 110, may include the components described with respect to FIG. 7A below. Similarly, a network node may include any suitable combination of hardware and/or software. For example, in particular embodiments, a network node, such as network node 120, may include the components described with respect to FIG. 8A below.

Particular embodiments obviate the problems described above and modify the formula for TBS determination to ensure that all code blocks have the same size. Particular embodiments ensure that all code blocks have the same size, which simplifies implementation of the encoder and decoder. By adjusting the TBS instead of padding zeros before code block segmentation, more efficient use of resources is achieved.

Consider the formula above:

$$TBS = 8 \times \left\lceil \frac{N_{PRB} \cdot N_{RE}^{DL,PRB} \cdot v \cdot Q_m \cdot R}{8} \right\rceil$$

The formula can also be described as $$TBS = 8 \times \left\lceil \frac{TBS_0}{8} \right\rceil$$

where $TBS_0$ is determined according to scheduling resources, MCS, and MIMO configuration:

$$TBS_0 = N_{PRB} \cdot N_{RE}^{DL,PRB} \cdot v \cdot Q_m \cdot R$$

In general, $TBS_0$ can be any formula for a desired approximate TBS. Another non-limiting example of how to determine $TBS_0$ is to find it in a look up table such as the LTE TBS table.

$TBS_0$ can be adjusted slightly to facilitate the code block segmentation procedure. The adjustment is done so that each of the code block segments have the same code block size (CBS), thus guaranteeing that the same shift size is used for the LDPC code. The adjustment also ensures that zero padding is not necessary in code block segmentation, similar to that of LTE turbo codes.

Assume that the number of code blocks C is determined in the following manner, which is similar to LTE:

Total number of code blocks C, and the CBS, are in general determined by:

if TBS+$L_1 \leq Z$

Number of code blocks: C=1
CBS=TBS;
else

Number of code blocks: $C=\lceil(TBS+L_2)/(Z-L_3)\rceil$

CBS=$\lceil(TBS+L_2)/C\rceil$ end if
If C=1:

In the above, variable $L_1$ is the number of CRC bits that are attached to the TBS when TBS is above a threshold $TBS_{thrsh}$, $TBS_{thrsh} \leq Z$, Z=8448. $L_1$ CRC bits are attached to each transport block, without code block level CRC bits. Typical value of $L_1$ is $L_1$=24. In the above, variable Z is the maximum information block size that is accepted at the input of an LDPC encoder. When $L_1$ CRC bits are attached to the length-TBS information payload before sending it to the input of LDPC encoder, then the block of (TBS+$L_1$) bits is composed of (a) TBS information payload bits, and (b) $L_1$ CRC bits.

When TBS+$L_1 \leq Z$, only TB-level CRC is attached, and no code block level CRC is attached. The $L_1$ CRC bits are generated to protect the TBS information payload bits.

If C>1,
$L_2$ CRC bits are attached to each transport block and $L_3$ additional CRC bits are attached to each CB after segmentation.

Some example values of $L_1$, $L_2$, and $L_3$ are 0, 8, 16, or 24. Some or all of $L_1$, $L_2$, and $L_3$ might be equal. One example is $L_1=L_2$=24 (bits), $L_3$=16 (bits).

In one non-limiting embodiment, the TBS is determined as follows:

---

If C = 1

$$TBS = A \times \left\lceil \frac{TBS_0}{A} \right\rceil$$

Else $$TBS = C \times A \times \left\lceil \frac{TBS_0 + L_2}{C \times A} \right\rceil$$

End if.

---

An example value of A is 8, to ensure that TBS is a multiple of 8 (i.e., byte-aligned). Another example is A=1 if TBS is not required to be byte-aligned.

Combining the TBS determination above with the CBS determination procedure results in the following procedure with $TBS_0$ as input.

--- if $A \times \left\lceil \frac{TBS_0}{A} \right\rceil + L_1 \leq Z$

Number of code blocks: C = 1

Transport block size (TBS): $TBS = A \times \left\lceil \frac{TBS_0}{A} \right\rceil$ (bits)

Length of information block to LDPC encoder = (TBS + $L_1$) (bits)
else
Number of code blocks: C = $\lceil(TBS_0 + L_2)/(Z - L_3)\rceil$ Transport block size (TBS): $TBS = C \times A \times \left\lceil \frac{TBS_0 + L_2}{C \times A} \right\rceil - L_2$ (bits)

Code block size: $CBS = A \times \left\lceil \frac{TBS_0 + L_2}{C \times A} \right\rceil$ (bits)

Length of information block to LDPC encoder = (CBS + $L_3$) (bits)
end if

---

In another non-limiting embodiment, the TBS is determined as follows:

---

If C = 1

$$TBS = A \times \left\lceil \frac{TBS_0}{A} \right\rceil$$

Else $$TBS = lcm(C, A) \times \left\lceil \frac{TBS_0 + L_2}{lcm(C, A)} \right\rceil - L_2$$

End if.

---

Here 1 cm (C,A) is the least common multiple of A and C. An example value of A is 8, to ensure that TBS is a multiple of 8. Another example is 1.

Combining the TBS determination above with the CBS determination procedure results in the following procedure with $TBS_0$ as input.

--- if $A \times \left\lceil \frac{TBS_0}{A} \right\rceil + L_1 \leq Z$

Number of code blocks: C = 1

Transport block size (TBS): $TBS = A \times \left\lceil \frac{TBS_0}{A} \right\rceil$ (bits)

Length of information block to LDPC encoder = (TBS + $L_1$) (bits)
else
Number of code blocks: C = $\lceil(TBS_0 + L_2)/(Z + L_3)\rceil$ Transport block size (TBS): $TBS = lcm(C, A) \times \left\lceil \frac{TBS_0 + L_2}{lcm(C, A)} \right\rceil - L_2$ (bits)

Code block size: $CBS = \frac{TBS + L_2}{C}$ (bits)

Length of information block to LDPC encoder = (CBS + $L_3$) (bits)
end if

---

Other non-limiting embodiments are obtained by replacing $\lceil \cdot \rceil$ with $\lfloor \cdot \rfloor$ in some or all of the expressions above.

Figure 5:
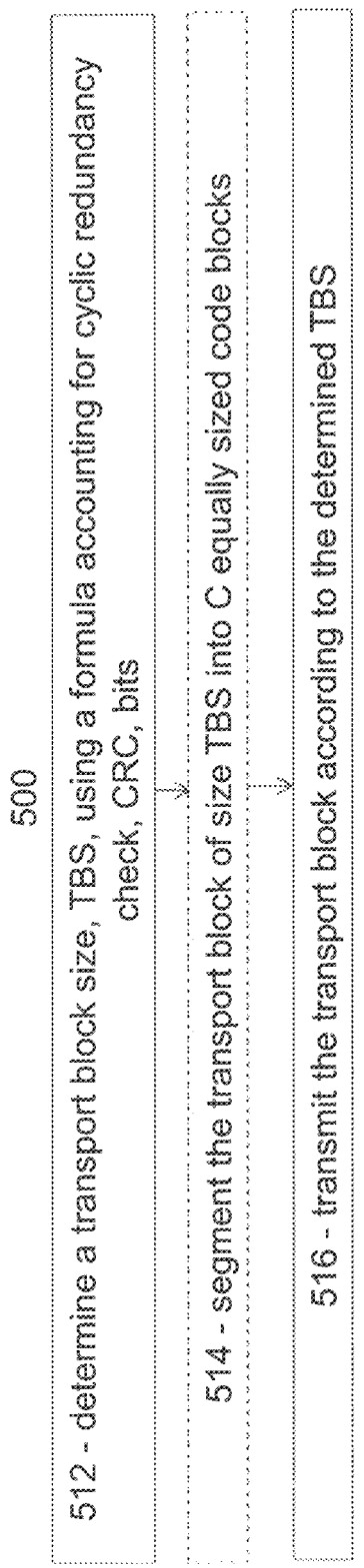
FIG. 5 is a flow diagram illustrating an example method in a wireless transmitter.

FIG. 5 is a flow diagram illustrating an example method in a wireless transmitter, according to particular embodiments. In particular embodiments, one or more steps of FIG. 5 may be performed by network node 120 or wireless device 110 of network 100 described with respect to FIG. 4.

The method begins at step 512, where the wireless transmitter determines a TBS for a transport block to be communicated between the wireless transmitter and a wireless receiver via a physical channel transmission. The TBS determination uses a formula accounting for CRC bits. For example, network node 120 may determine a TBS for a transport block to be communicated from network node 120 to wireless device 110.

In particular embodiments, the CRC bits include at least one of transport block CRC bits and code segmentation CRC bits. The formula may be based on an approximate transport block size, $TBS_0$, a number of code blocks, C, at least one of a number of CRC bits attached to the transport block, $L_2$, and a number of CRC bits added to each of the C code blocks, $L_3$.

In particular embodiments, the formula is based on a comparison of $TBS_0$ plus a number of CRC bits attached to the transport block with a threshold size, Z. When $TBS_0$ plus a number of CRC bits attached to the transport block is greater than the threshold size, Z, the formula includes dividing $TBS_0+L_2$ by C, rounding up to the nearest integer, and multiplying the result by C. Alternatively, when $TBS_0$ plus a number of CRC bits attached to the transport block is greater than the threshold size, Z, the formula includes dividing $TBS_0+L_2$ by C*A|, rounding up to the nearest integer, and multiplying the result by C*A, where A is a constant.

When $TBS_0$ plus a number of CRC bits attached to the transport block is less than the threshold size, Z, the formula includes dividing $TBS_0+L_2$ by C, rounding up to the nearest integer, and multiplying the result by C, wherein C=1.

In particular embodiments, the formula includes determining C based on dividing $TBS_0$ plus $L_2$ by Z minus $L_3$, and rounding up to the nearest integer. The formula may include determining the TBS by subtracting $L_2$. A may be one of 1 and 8. $L_2$ may be one of 0, 8, 16, and 24. $L_3$ may be one of 0, 8, 16, and 24. Z may be one of 3840 and 8448.

In particular embodiments, the formula includes determining $TBS_0$ based on available transmission resources by determining the approximate transport block size based on a function of one or more of a number of physical resource blocks, a number of resource elements per physical resource block, a number of layers, a modulation order, and a code rate. In some embodiments, the formula includes determining $TBS_0$ based on available transmission resources by determining the approximate transport block size based on a number of symbols available for transmission and a lookup table. In particular embodiments, the formula may include any of the formulas described above.

At step 514, the wireless transmitter may segment the transport block of size TBS into C equally sized code blocks. For example if the approximate transport block size plus a number of CRC bits is greater than a threshold, then network node 120 may segment the transport block into C equally sized code blocks according to any of the formulas described above.

At step 516, the wireless transmitter transmits the transport block according to the determined TBS. For example, network node 120 may transmit the transport block to wireless device 110 by transmitting the C equally sized code blocks.

Modifications, additions, or omissions may be made to method 500 of FIG. 5. Additionally, one or more steps in the method of FIG. 5 may be performed in parallel or in any suitable order. The steps may be repeated over time as necessary.

Figure 6:
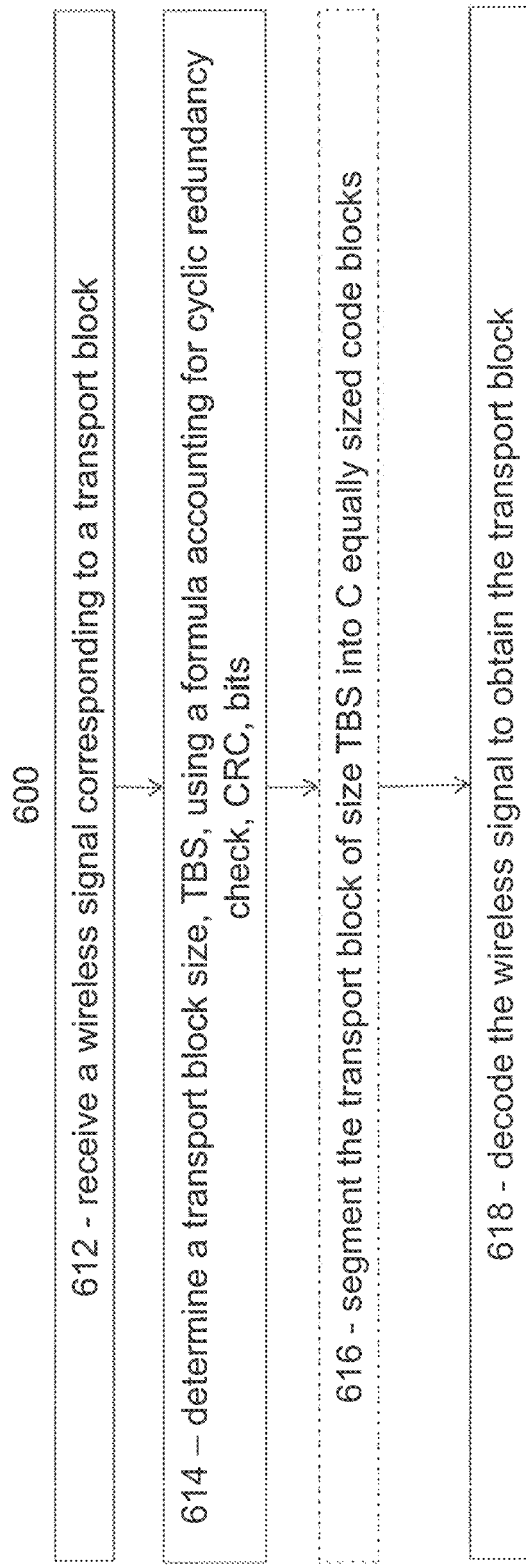
FIG. 6 is a flow diagram illustrating an example method in a wireless receiver.

FIG. 6 is a flow diagram illustrating an example method in a wireless receiver, according to particular embodiments. In particular embodiments, one or more steps of FIG. 6 may be performed by network node 120 or wireless device 110 of network 100 described with respect to FIG. 4.

The method begins at step 612, where the wireless receiver receives a wireless signal via a physical channel transmission from a wireless transmitter. The wireless signal corresponds to a transport block. For example, wireless device 110 may receive a wireless signal from network node 120 corresponding to the transport block transmitted in method 500.

At step 614, the wireless receiver determines a TBS using a formula accounting for CRC bits. For example, network node 120 may determine a TBS for the received transport block according to any of the formulas described above.

In particular embodiments, the CRC bits include at least one of transport block CRC bits and code segmentation CRC bits. The formula may be based on an approximate transport block size, $TBS_0$, a number of code blocks, C, at least one of a number of CRC bits attached to the transport block, $L_2$, and a number of CRC bits added to each of the C code blocks, $L_3$.

In particular embodiments, the formula is based on a comparison of $TBS_0$ plus a number of CRC bits attached to the transport block with a threshold size, Z. When $TBS_0$ plus a number of CRC bits attached to the transport block is greater than the threshold size, Z, the formula includes dividing $TBS_0+L_2$ by C, rounding up to the nearest integer, and multiplying the result by C. Alternatively, when $TBS_0$ plus a number of CRC bits attached to the transport block is greater than the threshold size, Z, the formula includes dividing $TBS_0+L_2$ by C*A, rounding up to the nearest integer, and multiplying the result by C*A, where A is a constant.

When $TBS_0$ plus a number of CRC bits attached to the transport block is less than the threshold size, Z, the formula includes calculating $A*\text{ceil}(TBS_0/A)$ for a constant A, wherein, optionally, A=8.

In particular embodiments, the formula includes determining C based on dividing $TBS_0$ plus $L_2$ by Z minus $L_3$, and rounding up to the nearest integer. The formula may include determining the TBS by subtracting $L_2$. The formula may include determining the TBS by multiplying C by a constant, A, to ensure that the TBS is a multiple of A. A may be one of 1 and 8. $L_2$ may be one of 0, 8, 16, and 24. $L_3$ may be one of 0, 8, 16, and 24. Z may be one of 3840 and 8448.

In particular embodiments, the formula includes determining $TBS_0$ based on available transmission resources by determining the approximate transport block size based on a function of one or more of a number of physical resource blocks, a number of resource elements per physical resource block, a number of layers, a modulation order, and a code rate. In some embodiments, the formula includes determining $TBS_0$ based on available transmission resources by determining the approximate transport block size based on a number of symbols available for transmission and a lookup table.

At step 616, the wireless receiver may segment the transport block of size TBS into C equally sized code blocks. For example if the approximate transport block size plus a number of CRC bits is greater than a threshold, then network node 120 may segment the transport block into C equally sized code blocks according to any of the formulas described above.

At step 618, the wireless receiver decodes the wireless signal to obtain the transport block. For example, wireless device 110 may decode the wireless signal by decoding the C equally sized code blocks and combining the decoded code blocks into the transport block.

Modifications, additions, or omissions may be made to method 600 of FIG. 6. Additionally, one or more steps in the method of FIG. 6 may be performed in parallel or in any suitable order. The steps may be repeated over time as necessary.

Figure 7B:
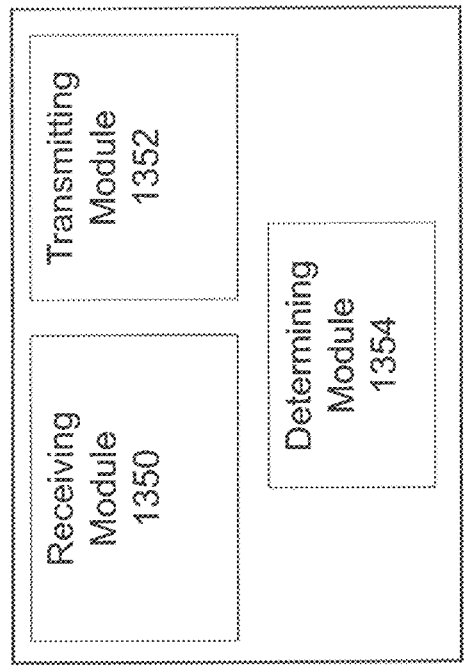
FIG. 7B is a block diagram illustrating example components of a wireless device.
Figure 7A:
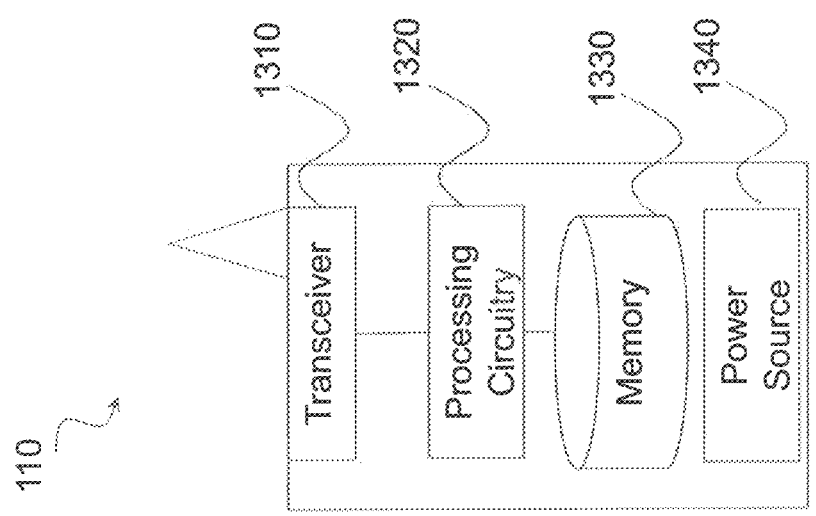
FIG. 7A is a block diagram illustrating an example embodiment of a wireless device.

FIG. 7A is a block diagram illustrating an example embodiment of a wireless device. The wireless device is an example of the wireless devices 110 illustrated in FIG. 4. In particular embodiments, the wireless device is capable of segmenting a transport block into equally sized code blocks according to any of the embodiments described above.

Particular examples of a wireless device include a mobile phone, a smart phone, a PDA (Personal Digital Assistant), a portable computer (e.g., laptop, tablet), a sensor, a modem, a machine type (MTC) device/machine to machine (M2M) device, laptop embedded equipment (LEE), laptop mounted equipment (LME), USB dongles, a device-to-device capable device, a vehicle-to-vehicle device, or any other device that can provide wireless communication. The wireless device includes transceiver 1310, processing circuitry 1320, memory 1330, and power source 1340. In some embodiments, transceiver 1310 facilitates transmitting wireless signals to and receiving wireless signals from wireless network node 120 (e.g., via an antenna), processing circuitry 1320 executes instructions to provide some or all of the functionality described herein as provided by the wireless device, and memory 1330 stores the instructions executed by processing circuitry 1320. Power source 1340 supplies electrical power to one or more of the components of wireless device 110, such as transceiver 1310, processing circuitry 1320, and/or memory 1330.

Processing circuitry 1320 includes any suitable combination of hardware and software implemented in one or more integrated circuits or modules to execute instructions and manipulate data to perform some or all of the described functions of the wireless device. In some embodiments, processing circuitry 1320 may include, for example, one or more computers, one more programmable logic devices, one or more central processing units (CPUs), one or more microprocessors, one or more applications, and/or other logic, and/or any suitable combination of the preceding. Processing circuitry 1320 may include analog and/or digital circuitry configured to perform some or all of the described functions of wireless device 110. For example, processing circuitry 1320 may include resistors, capacitors, inductors, transistors, diodes, and/or any other suitable circuit components.

Memory 1330 is generally operable to store computer executable code and data. Examples of memory 1330 include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or or any other volatile or non-volatile, non-transitory computer-readable and/or computer-executable memory devices that store information.

Power source 1340 is generally operable to supply electrical power to the components of wireless device 110. Power source 1340 may include any suitable type of battery, such as lithium-ion, lithium-air, lithium polymer, nickel cadmium, nickel metal hydride, or any other suitable type of battery for supplying power to a wireless device.

Other embodiments of the wireless device may include additional components (beyond those shown in FIG. 7A) responsible for providing certain aspects of the wireless device's functionality, including any of the functionality described above and/or any additional functionality (including any functionality necessary to support the solution described above).

FIG. 7B is a block diagram illustrating example components of a wireless device 110. The components may include receiving module 1350, transmitting module 1352, and determining module 1354.

Receiving module 1350 may perform the receiving functions of wireless device 110. For example, receiving module 1350 may receive a transport block segmented into equally sized code blocks. Receiving module 1350 may perform the receiving functions according to any of the examples and embodiments described above. In certain embodiments, receiving module 1350 may include or be included in processing circuitry 1320. In particular embodiments, receiving module 1350 may communicate with transmitting module 1352 and determining module 1354.

Transmitting module 1352 may perform the transmitting functions of wireless device 110. For example, transmitting module 1352 may transmit a transport block segmented into equally sized code blocks according to any of the embodiments described above. In certain embodiments, transmitting module 1352 may include or be included in processing circuitry 1320. In particular embodiments, transmitting module 1352 may communicate with receiving module 1350 and determining module 1354.

Determining module 1354 may perform the determining functions of wireless device 110. For example, determining module 1354 may determine equally sized code blocks for a transport block according to any of the embodiments described above. In certain embodiments, determining module 1354 may include or be included in processing circuitry 1320. In particular embodiments, determining module 1354 may communicate with receiving module 1350 and transmitting module 1352.

Figure 8B:
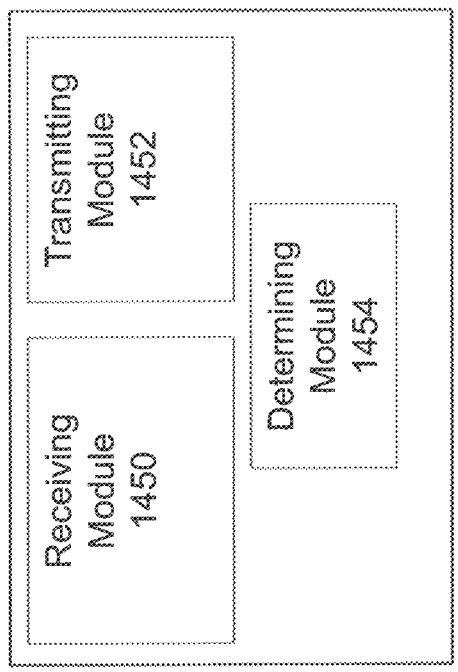
FIG. 8B is a block diagram illustrating example components of a network node.
Figure 8A:
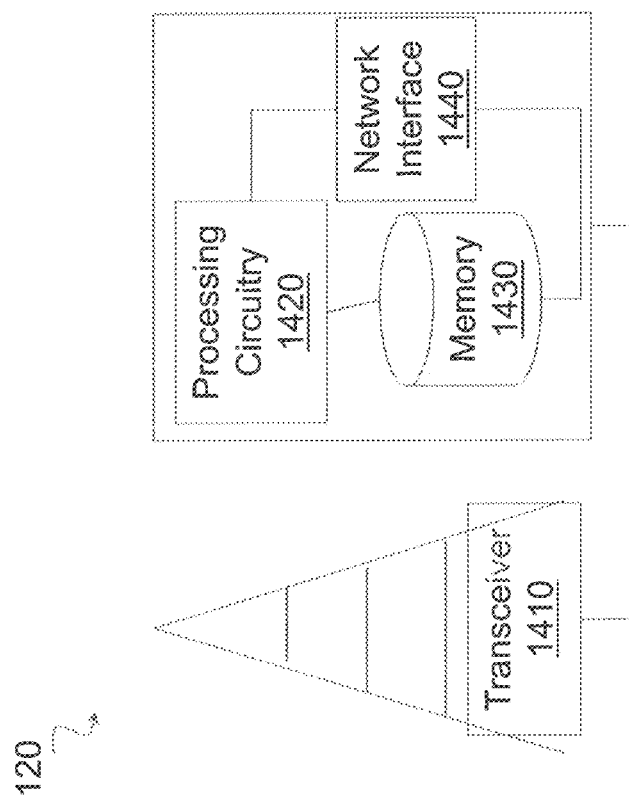
FIG. 8A is a block diagram illustrating an example embodiment of a network node.

FIG. 8A is a block diagram illustrating an example embodiment of a network node. The network node is an example of the network node 120 illustrated in FIG. 4. In particular embodiments, the network node is capable of segmenting a transport block into equally sized code blocks according to any of the embodiments described above.

Network node 120 can be an eNodeB, a nodeB, a base station, a wireless access point (e.g., a Wi-Fi access point), a low power node, a base transceiver station (BTS), a transmission point or node, a remote RF unit (RRU), a remote radio head (RRH), or other radio access node. The network node includes at least one transceiver 1410, at least one processing circuitry 1420, at least one memory 1430, and at least one network interface 1440. Transceiver 1410 facilitates transmitting wireless signals to and receiving wireless signals from a wireless device, such as wireless devices 110 (e.g., via an antenna); processing circuitry 1420 executes instructions to provide some or all of the functionality described above as being provided by a network node 120; memory 1430 stores the instructions executed by processing circuitry 1420; and network interface 1440 communicates signals to backend network components, such as a gateway, switch, router, Internet, Public Switched Telephone Network (PSTN), controller, and/or other network nodes 120. Processing circuitry 1420 and memory 1430 can be of the same types as described with respect to processing circuitry 1320 and memory 1330 of FIG. 7A above.

In some embodiments, network interface 1440 is communicatively coupled to processing circuitry 1420 and refers to any suitable device operable to receive input for network node 120, send output from network node 120, perform suitable processing of the input or output or both, communicate to other devices, or any combination of the preceding. Network interface 1440 includes appropriate hardware (e.g., port, modem, network interface card, etc.) and software, including protocol conversion and data processing capabilities, to communicate through a network.

FIG. 8B is a block diagram illustrating example components of a network node 120. The components may include receiving module 1450, transmitting module 1452, and determining module 1454.

Receiving module 1450 may perform the receiving functions of network node 120. For example, receiving module 1450 may receive a transport block segmented into equally sized code blocks according to any of the embodiments described above. In certain embodiments, receiving module 1450 may include or be included in processing circuitry 1420. In particular embodiments, receiving module 1450 may communicate with transmitting module 1452 and determining module 1454.

Transmitting module 1452 may perform the transmitting functions of network node 120. For example, transmitting module 1452 may transmit a transport block segmented into equally sized code blocks according to any of the embodiments described above. In certain embodiments, transmitting module 1452 may include or be included in processing circuitry 1420. In particular embodiments, transmitting module 1452 may communicate with receiving module 1450 and determining module 1454.

Determining module 1454 may perform the determining functions of network node 120. For example, determining module 1454 may determine equally sized code blocks for a transport block according to any of the embodiments described above. In certain embodiments, determining module 1454 may include or be included in processing circuitry 1420. In particular embodiments, determining module 1454 may communicate with receiving module 1450 and transmitting module 1452.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

A first node and a second node are sometimes described as two nodes. An example of a first node could be a network node, which could be a more general term and can correspond to any type of radio network node or any network node, which communicates with a UE and/or with another network node. Examples of network nodes are NodeB, base station (BS), multi-standard radio (MSR) radio node such as MSR BS, eNodeB, gNodeB. MeNB, SeNB, network controller, radio network controller (RNC), base station controller (BSC), relay, donor node controlling relay, base transceiver station (BTS), access point (AP), transmission points, transmission nodes, RRU, RRH, nodes in distributed antenna system (DAS), core network node (e.g. MSC, MME, etc.), O&M, OSS, SON, positioning node (e.g. E-SMLC), MDT etc.

Another example of a node could be user equipment, this is a non-limiting term user equipment (UE) and it refers to any type of wireless device communicating with a network node and/or with another UE in a cellular or mobile communication system. Examples of UE are target device, device to device (D2D) UE, machine type UE or UE capable of machine to machine (M2M) communication, PDA, iPad, Tablet, mobile terminals, smart phone, laptop embedded equipped (LEE), laptop mounted equipment (LME), USB dongles etc.

In some embodiments generic terminology, "radio network node" or simply "network node (NW node)", is used. It can be any kind of network node which may comprise of base station, radio base station, base transceiver station, base station controller, network controller, evolved Node B (eNB), Node B, relay node, access point, radio access point, Remote Radio Unit (RRU) Remote Radio Head (RRH) etc.

In this invention, any of the above mentioned nodes could become "the first node" and/or "the second node".

The term radio access technology, or RAT, may refer to any RAT e.g. UTRA, E-UTRA, narrow band internet of things (NB-IoT), WiFi, Bluetooth, next generation RAT (NR), 4G, 5G, etc. Any of the first and the second nodes may be capable of supporting a single or multiple RATs.

The following list provides non-limiting examples of how certain aspects of the proposed solutions could be implemented. The examples are merely intended to illustrate how certain aspects of the proposed solutions could be implemented, however, the proposed solutions could also be implemented in other suitable manners. Examples include:

1. A method for use in a wireless transmitter of segmenting a transport block so that the resulting code blocks are all the same size, the method comprising:

adjusting a transport block according to the following formula:

$$\text{If } C = 1$$
$$TBS = A \times \left\lceil \frac{TBS_0}{A} \right\rceil$$
$$\text{Else}$$
$$TBS = C \times A \times \left\lceil \frac{TBS_0 + L_2}{C \times A} \right\rceil - L_2$$
$$\text{End if.}$$

and;

determining a code block size according to the following formula:

$$\text{if } A \times \left\lceil \frac{TBS_0}{A} \right\rceil + L_1 \leq Z$$

Number of code blocks: $C = 1$

Transport block size $(TBS): TBS = A \times \left\lceil \frac{TBS_0}{A} \right\rceil$ (bits)

Length of information block to LDPC encoder = $(TBS + L_1)$ (bits)

else

Number of code blocks: $C = \lceil (TBS_0 + L_2)/(Z - L_3) \rceil$

Transport block size $(TBS): TBS = C \times A \times \left\lceil \frac{TBS_0 + L_2}{C \times A} \right\rceil - L_2$ (bits)

Code block size: $CBS = A \times \left\lceil \frac{TBS_0 + L_2}{C \times A} \right\rceil$ (bits)

Length of information block to LDPC encoder = $(CBS + L_3)$ (bits)

end if

2. A method for use in a wireless transmitter of segmenting a transport block so that the resulting code blocks are all the same size, the method comprising:

adjusting a transport block according to the following formula:

$$\text{If } C = 1$$
$$TBS = A \times \left\lceil \frac{TBS_0}{A} \right\rceil$$
$$\text{Else}$$
$$TBS = lcm(C, A) \times \left\lceil \frac{TBS_0 + L_2}{lcm(C, A)} \right\rceil$$
$$\text{End if.}$$

and;

determining a code block size according to the following formula:

$$\text{if } A \times \left\lceil \frac{TBS_0}{A} \right\rceil + L_1 \leq Z$$

Number of code blocks: $C = 1$

Transport block size $(TBS): TBS = A \times \left\lceil \frac{TBS_0}{A} \right\rceil$ (bits)

Length of information block to LDPC encoder = (TBS + $L_1$) (bits)
else
    Number of code blocks: C = $\lceil (TBS_0 + L_2)/(Z - L_3) \rceil$
    Transport block size $(TBS): TBS = lcm(C, A) \times \left\lceil \dfrac{TBS_0 + L_2}{lcm(C, A)} \right\rceil - L_2$ (bits)
    Code block size: $CBS = \dfrac{TBS + L_2}{C}$ (bits)
    Length of information block to LDPC encoder = (CBS + $L_3$) (bits)
end if 3. The method of any of embodiments 1-2, wherein A=8.
4. The method of any of embodiments 1-2, wherein A=1.
5. A network node comprising processing circuitry operable to perform the method of any of embodiments 1-4.
6. A wireless device comprising processing circuitry operable to perform the method of any of embodiments 1-4.
7. A computer program comprising computer-readable instructions for causing at least one programmable processor to perform the method of any of embodiments 1-4.

Modifications, additions, or omissions may be made to the methods disclosed herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the claims below.

ABBREVIATIONS USED IN THE PRECEDING DESCRIPTION INCLUDE

3GPP Third Generation Partnership Project
BBU Baseband Unit
BTS Base Transceiver Station
CC Component Carrier
CQI Channel Quality Information
CSI Channel State Information
D2D Device to Device
DFT Discrete Fourier Transform
eNB eNodeB
FDD Frequency Division Duplex
gNB Next-generation NodeB
LAA Licensed-Assisted Access
LBT Listen-before-talk
LTE Long Term Evolution
LTE-U LTE in Unlicensed Spectrum
M2M Machine to Machine
MIMO Multi-Input Multi-Output
MTC Machine Type Communication
NR New Radio
OFDM Orthogonal Frequency Division Multiplexing
RAN Radio Access Network
RAT Radio Access Technology
RBS Radio Base Station
RNC Radio Network Controller
RRC Radio Resource Control
RRH Remote Radio Head
RRU Remote Radio Unit
SCell Secondary Cell
TB Transport Block
TBS Transport Block Size
sTTI Short TTI
TDD Time Division Duplex
TTI Transmission Time Interval
UE User Equipment
UL Uplink
UTRAN Universal Terrestrial Radio Access Network
WAN Wireless Access Network

The invention claimed is:

1. A wireless transmitter comprising processing circuitry operable to:
determine a transport block size, TBS, for a transport block to be communicated between the wireless transmitter and a wireless receiver via a physical channel transmission, the TBS determination using a formula accounting for cyclic redundancy check, CRC, bits wherein the formula is based on an approximate transport block size, $TBS_0$, a number of code blocks, C, a number of CRC bits attached to the transport block, $L_2$, and a number of CRC bits added to each of the C code blocks, $L_3$; and
transmit the transport block according to the determined TBS.

2. The wireless transmitter of claim 1, wherein the formula is based on a comparison of $TBS_0$ plus a number of CRC bits attached to the transport block with a threshold size, Z.

3. The wireless transmitter of claim 2, wherein the formula is based on a comparison of $TBS_0$ plus a number of CRC bits attached to the transport block with a threshold size, Z.

4. The wireless transmitter of claim 2, wherein when $TBS_0$ plus a number of CRC bits attached to the transport block is greater than the threshold size, Z, the formula includes dividing $TBS_0+L_2$ by C*A|, rounding up to the nearest integer, and multiplying the result by C*A, where A is a constant.

5. The wireless transmitter of claim 2, wherein the formula includes determining C based on dividing $TBS_0$ plus $L_2$ by Z minus $L_3$, and rounding up to the nearest integer.

6. The wireless transmitter of claim 1, wherein the formula includes determining the TBS by subtracting $L_2$.

7. The wireless transmitter of claim 2, wherein when $TBS_0$ plus a number of CRC bits attached to the transport block is less than the threshold size, Z, the formula includes calculating A*ceil(TBS0/A) for a constant A.

8. The wireless transmitter of claim 4, wherein A is 8.

9. The wireless transmitter of claim 2, wherein $L_2$ is 24, $L_3$ is 24; and Z is one of 3840 and 8448.

10. The wireless transmitter of claim 1, wherein the formula includes determining $TBS_0$ based on available transmission resources by determining the approximate transport block size based on a number of symbols available for transmission and a lookup table.

11. A method for use in a wireless transmitter, the method comprising:
- determining a transport block size, TBS, for a transport block to be communicated between the wireless transmitter and a wireless receiver via a physical channel transmission, the TBS determination using a formula accounting for cyclic redundancy check, CRC, bits wherein the formula is based on an approximate transport block size, $TBS_0$, a number of code blocks, C, a number of CRC bits attached to the transport block, $L_2$, and a number of CRC bits added to each of the C code blocks, $L_3$; and
- transmitting the transport block according to the determined TBS.

12. The method of claim 11, wherein the formula is based on a comparison of $TBS_0$ plus a number of CRC bits attached to the transport block with a threshold size, Z.

13. The method of claim 12, wherein when $TBS_0$ plus a number of CRC bits attached to the transport block is greater than the threshold size, Z, the formula includes dividing $TBS_0+L_2$ by C, rounding up to the nearest integer, and multiplying the result by C.

14. A wireless receiver comprising processing circuitry operable to:
- receive a wireless signal via a physical channel transmission from a wireless transmitter, the wireless signal corresponding to a transport block;
- determine a transport block size, TBS, using a formula accounting for cyclic redundancy check, CRC, bits wherein the formula is based on an approximate transport block size, $TBS_0$, a number of code blocks, C, a number of CRC bits attached to the transport block, L2, and number of CRC bits added to each of the C code bocks, L3; and
- decode the wireless signal to obtain the transport block.

* * * * *